United States Patent
Neal et al.

(10) Patent No.: US 7,367,484 B2
(45) Date of Patent: May 6, 2008

(54) AUTOMATIC FASTENER LOADER

(75) Inventors: Brandon S. Neal, Chambersburg, PA (US); Richard D. Jiranek, Parkton, MD (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/556,714

(22) Filed: Nov. 6, 2006

(65) Prior Publication Data

US 2007/0157449 A1    Jul. 12, 2007

Related U.S. Application Data

(60) Provisional application No. 60/756,986, filed on Jan. 6, 2006.

(51) Int. Cl.
*B25C 1/00* (2006.01)
(52) U.S. Cl. ............... 227/120; 227/119; 227/109; 227/114
(58) Field of Classification Search .......... 227/2, 227/107, 110, 119, 112, 156, 109, 114, 35; 81/435, 431, 57.37
See application file for complete search history.

(56) References Cited

U.S. PATENT DOCUMENTS

| | | | | | |
|---|---|---|---|---|---|
| 4,463,889 | A | * | 8/1984 | Sartran | 227/112 |
| 4,643,344 | A | * | 2/1987 | Kaita et al. | 227/112 |
| 5,004,141 | A | * | 4/1991 | Young et al. | 227/112 |
| 5,156,314 | A | * | 10/1992 | Wallace | 227/107 |
| 5,588,576 | A | * | 12/1996 | Knetsch | 227/119 |
| 5,964,393 | A | * | 10/1999 | Feldpausch et al. | 227/135 |
| 6,574,856 | B2 | * | 6/2003 | Raccosta et al. | 29/709 |
| 6,789,309 | B2 | * | 9/2004 | Kondo | 29/709 |

* cited by examiner

*Primary Examiner*—Rinaldi I. Rada
*Assistant Examiner*—Paul Durand

(57) ABSTRACT

An automatic fastener loader includes a support member and a feed tube having an end. The feed tube is mounted to the support member. In an exemplary embodiment, a pivotable frame is mounted for oscillation on the support member between a receiving position and a loading position. The frame includes a receiver for receiving a fastener. A holster is mounted to the support member for receiving a fastener driver to load a fastener onto a bit of the fastener driver when the frame is in the loading position. An actuator is mounted to the support member and is operatively connected to the pivotable frame for actuating the frame to index the frame between the receiving position and the loading position.

9 Claims, 4 Drawing Sheets

AUTOMATIC FASTENER LOADER

CROSS-REFERENCE TO RELATED APPLICATIONS

This application claims the benefit of U.S. Provisional Patent Application No. 60/756,986 filed Jan. 6, 2006.

TECHNICAL FIELD

This invention relates to loading of fasteners onto a tool, and more particularly to automatic loading of fasteners.

BACKGROUND OF THE INVENTION

It is known in close quarter assembly work, such as mass assembling of sub-components of an automatic transmission, that due to the constrained assembly access in the transmission, conventional "blow feed" fastener loading applications are not ideal. For example, in such close quarter assembly work, a lack of access for a tool with a receiving nosepiece to hold the fastener may be an issue. Also, even if a conventional nosepiece could be used, the nosepiece could obstruct all visual access to the particular sub-component, rendering assembly difficult.

SUMMARY OF THE INVENTION

The present invention provides a unique method of blow feeding fasteners without use of an end fixture nosepiece, which adds weight and obstructs the view of tight assembly spaces, while allowing an unlimited and unrestricted view of the assembly target. The invention auto loads fasteners securely on a tool bit for a user so the user can operate the fastening system without ever loading a fastener by hand.

In an exemplary embodiment of the invention, an automatic fastener loader includes a support member and a feed tube having an end. The feed tube is mounted to the support member. A pivotable frame is mounted for oscillation on the support member between a receiving position and a loading position. The frame includes a receiver for receiving a fastener. A holster is mounted to the support member for receiving a fastener driver to load a fastener onto a bit of the fastener driver when the frame is in the loading position. An actuator is mounted to the support member and is operatively connected to the pivotable frame for actuating the frame to index the frame between the receiving position and the loading position.

The invention also allows for a simple one-hand, three step operation to perform any particular assembly. Step 1: Extract the fastener driver (e.g. hand tool) from the receiver (with fastener already seated on the tool). Step 2: Insert and operate the tool in the assembly, such as a transmission. Step 3: Return the tool to the receiver to have another fastener automatically loaded on the tool bit for the next job use.

These and other features and advantages of the invention will be more fully understood from the following description of certain specific embodiments of the invention taken together with the accompanying drawings.

DESCRIPTION OF AN EXEMPLARY EMBODIMENT

Figure 1:
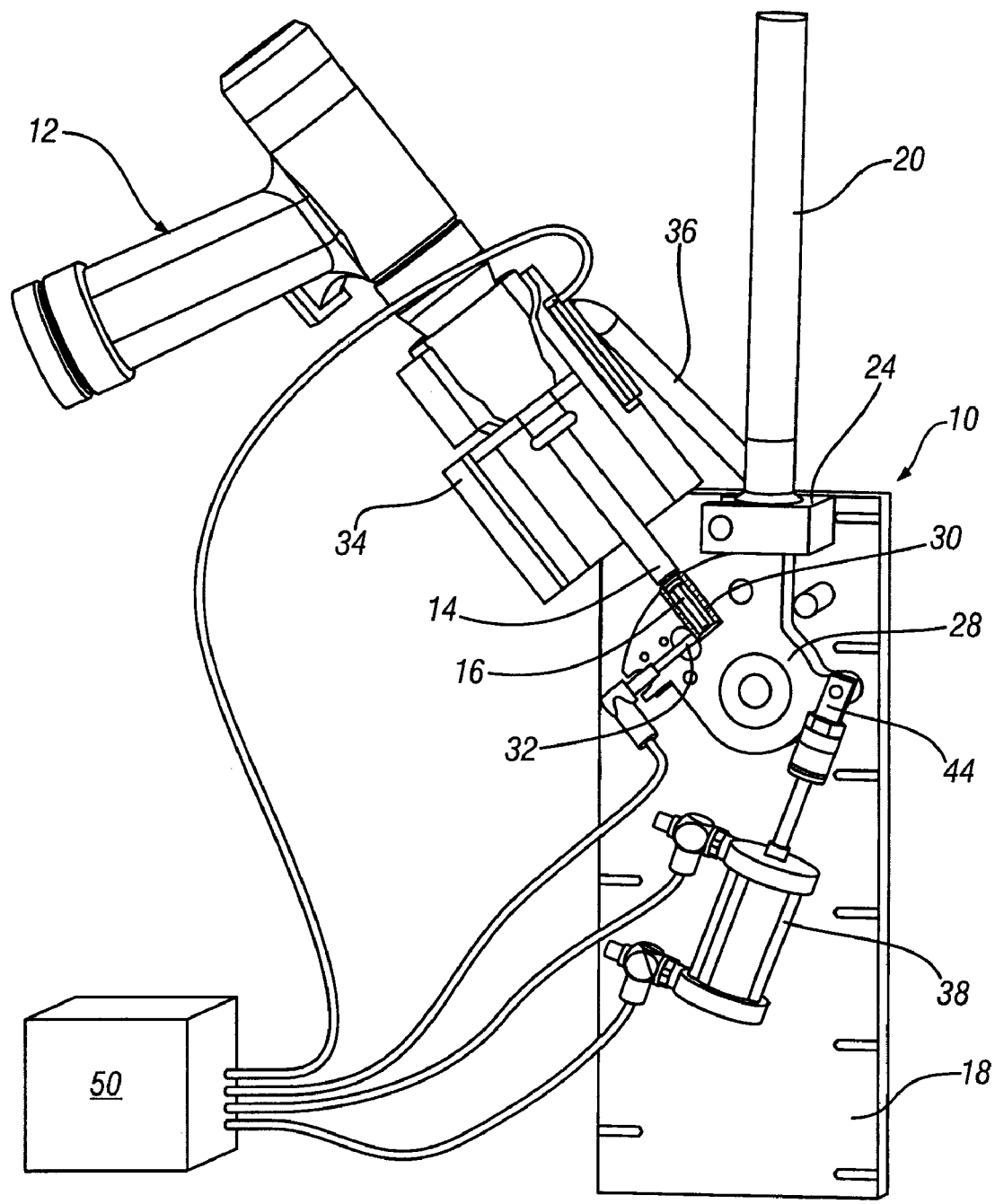
FIG. 1 is a pictorial view of an automatic fastener loader in accordance with the present invention illustrating automatic loading of a fastener onto a fastener driver.
Figure 2:
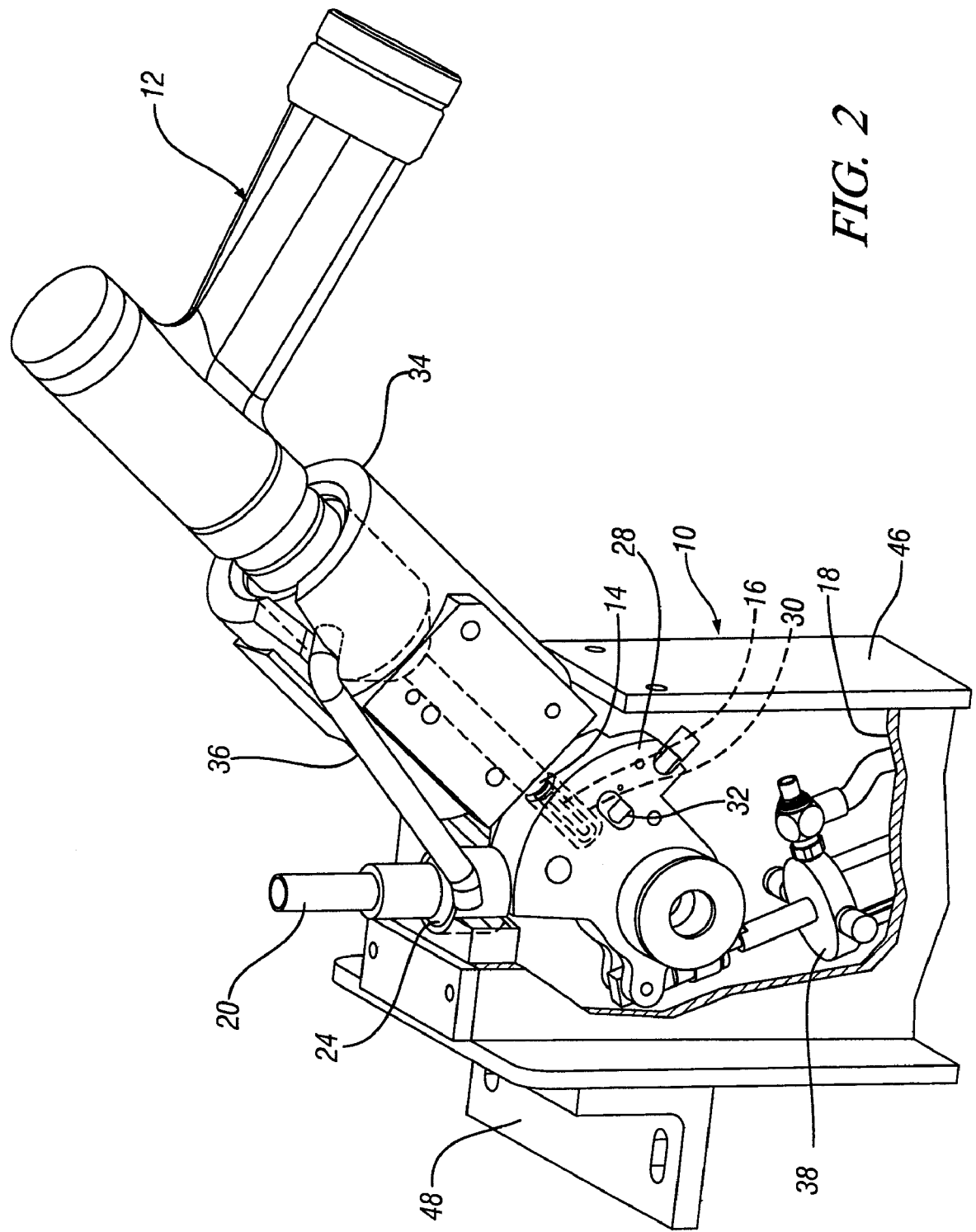
FIG. 2 is a perspective view of an automatic fastener loader similar to FIG. 1.

Referring now to the drawings in detail, numeral 10 generally indicates an exemplary embodiment of an automatic fastener loader in accordance with the invention. The fastener loader 10 provides for automatic, self-actuating, secure loading of fasteners onto a tool such as a fastener driver 12 or similar device. This eliminates the need to use an end fixture nosepiece on the fastener driver. The fastener loader 10 allows for hands-free fastener loading. In other words, fasteners are loaded onto the fastener driver 12 without the user having to touch the individual fasteners. Overall, the fastener loader 10 provides for a one-hand, three step operation for performing a fastening function: one-hand loading of a fastener on a tool using the automatic fastener loader 10; one-hand application of the fastener with the tool; and one-hand return of the tool to the automatic fastener loader 10 to reload the tool.

More particularly, with reference to FIGS. 1 through 4, a fastener driver 12 such as a screwdriver or other similar device for use with the automatic fastener loader 10 includes a magnetic bit 14. The magnetic bit 14 may be, for example, a screw bit or other similar bit. A fastener 16 can be loaded onto the magnetic bit 14 of the fastener driver 12 via the automatic fastener loader 10 without a user of the fastener driver 12 having to physically touch the fastener.

The automatic fastener loader 10 includes a support member 18 and a feed tube 20 having an end 22. The feed tube 20 is mounted to the support member 18. Fasteners 16 are fed through the feed tube 20 from a fastener source (not shown). For example, fasteners 16 may be individually blown through the feed tube 20 as needed. A tube end fitting 24 may be connected to the end 22 of the feed tube 20, and the feed tube may be mounted to the support member 18 by the end fitting. The end fitting 24 may include a gradual lead-in feature 26 such as a tapered inner diameter or truncated conical inner surface. In general, the gradual lead-in feature is defined by an inner diameter that decreases from one end of the end fitting 24 to the other.

Figure 3:
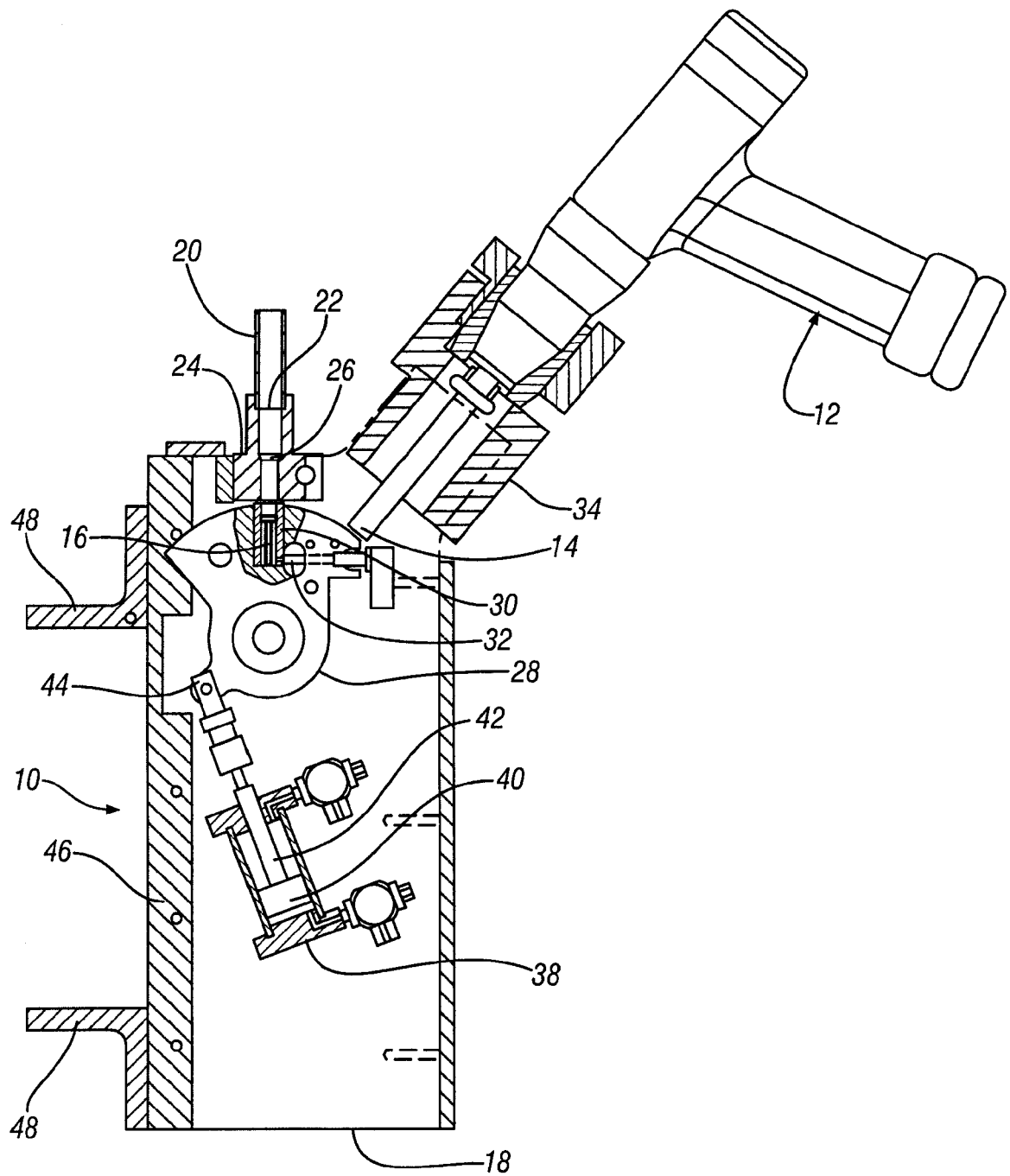
FIG. 3 is a sectional view of the automatic fastener loader of FIG. 2 taken along the line 3-3 of FIG. 2 illustrating the loader in a fastener receiving position.

A pivotable frame 28 is mounted for oscillation on the support member 18. Alternatively, a laterally or otherwise moveable frame may be substituted for the pivotal frame 28 illustrated in the drawings. The pivotable frame 28 includes a receiver 30 for receiving and temporarily retaining a fastener 16. The receiver 30 may be a generally cylindrical member having an open end and a hollow interior sized to receive fasteners of various sizes and shapes, depending upon the application of the loader 10. The pivotable frame 28 rotates between a fastener receiving position and a fastener loading position lying in a common plane. The fastener receiving position is illustrated in FIG. 3. In the fastener receiving position, the receiver 30 is aligned with the feed tube 20 such that a fastener 16 fed through the feed tube 20 passes from the feed tube through the end fitting 24 into the receiver.

A proximity sensor 32 may be mounted on the pivotable frame 28 adjacent the receiver 30. The proximity sensor 32 detects the presence or absence of a fastener 16 in the receiver 30.

Figure 4:
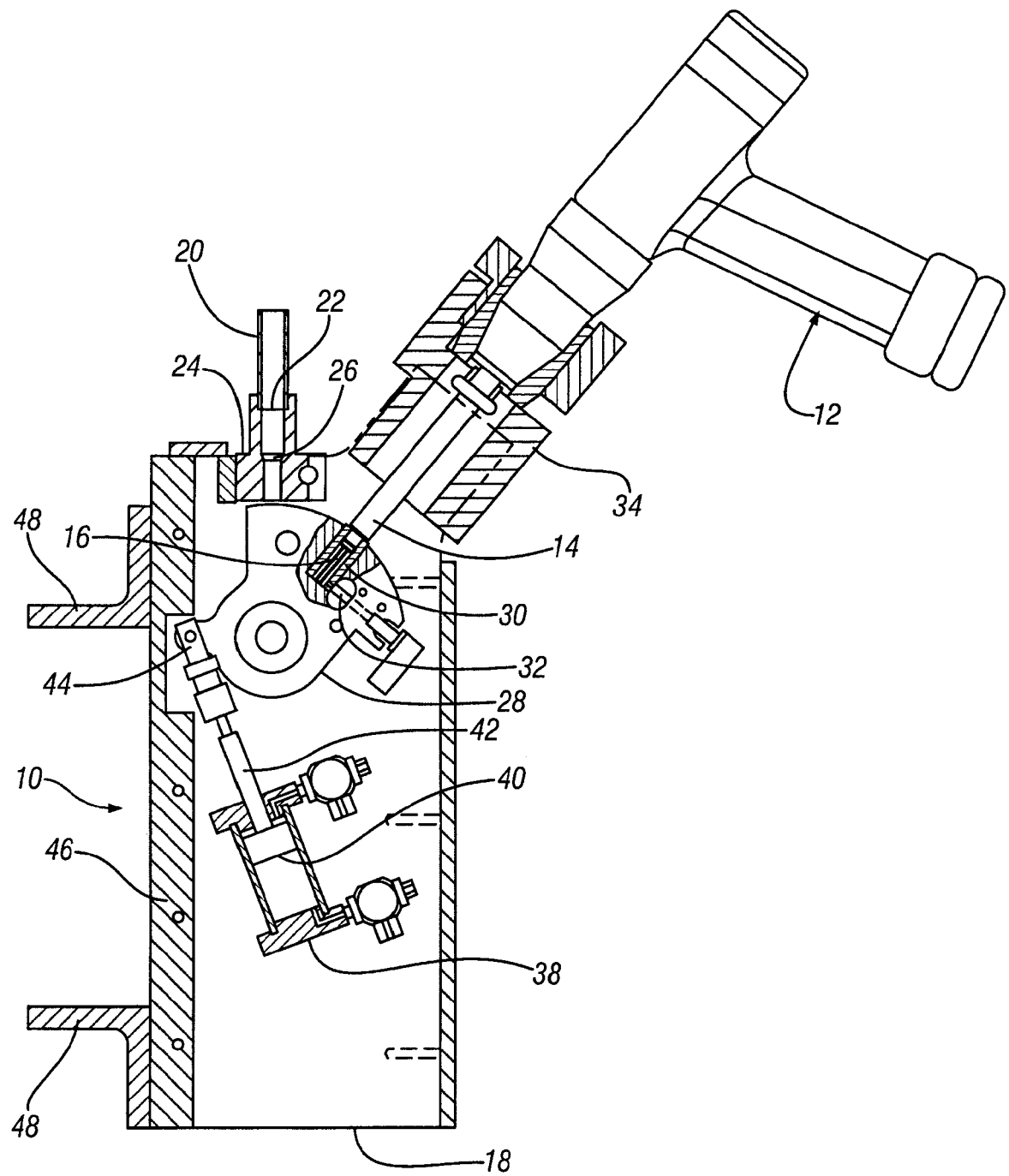
FIG. 4 is a view similar to FIG. 3 illustrating the loader in a tool loading position.

A holster 34 is mounted to the support member 18 for receiving the fastener driver 12 in order to load a fastener 16 onto the bit 14 of the driver when the pivotable frame 28 is in the fastener loading position. The fastener loading position is illustrated in FIG. 4. In the fastener loading position, a fastener 16 held in the receiver 30 is aligned with the bit 14 of the driver 12 held in the holster 34. It is understood that the fastener receiver 30 is formed of a non-magnetic material to allow the magnetic bit 14 to withdraw the screw fastener from the receiver without magnetic interference from the receiver. A proximity sensor 36 may be mounted to the holster 34. The proximity sensor 36 detects the presence or absence of a fastener driver 12 in the holster 34.

An actuator 38 is mounted to the support member 18 and operatively connected to the pivotable frame 28 for actuating the frame 28 to index the frame between the receiving position (FIG. 3) and the loading position (FIG. 4). The actuator 38 may be a pneumatic cylinder, a hydraulic cylinder, an electro-mechanical actuator, or another similar actuating device. In the embodiment shown in the drawings, the actuator 38 is shown as a pneumatic cylinder. The actuator 38 may include a piston 40 connected to a shaft 42 having an end 44 adapted for coupling with the pivotable frame 28.

The fastener loader 10 may also include a housing 46. The support member 18 may form one of the walls of the housing 46. The housing 46 may surround the end fitting 24 of the feed tube 20, the pivotable frame 28, and the actuator 38. The holster 34 may extend from the housing 46. The housing 46 may also include at least one mounting member 48 for mounting the housing to a separate support device (not shown), such as a workstation. In the embodiment shown, the housing 46 includes two mounting members 48.

A controller 50 may be in communication with the actuator 38 for operating the actuator to index the pivotable frame 28 between the receiving position and the loading position. The controller 50 may signal the actuator 38 to extend and contract, causing pivotal rotation of the frame 28. The controller 50 may also be in communication with the proximity sensors 32, 36. The controller 50 receives signals from the proximity sensor 32 indicating the presence or absence of a fastener 16 in the receiver 30. The controller 50 similarly receives signals from the proximity sensor 36 indicating the presence or absence of a fastener driver 12 in the holster 34. Further, the controller 50 may be in communication with a feeding device, such as a blow feed device, that sends fasteners 16 from a fastener source through the feed tube 20. The controller 50 may signal the feeding device to send a fastener 16 through the feed tube 20 when no fastener is present in the receiver 30 and the frame 28 is in the receiving position.

Specifically, the automatic fastener loader 10 may function and be utilized as follows. When the proximity sensor 32 detects the absence of a fastener in the receiver 30 and the proximity sensor 36 detects the absence of a fastener driver 12 in the holster 34, the controller 50 signals the actuator 38 to index the pivotable frame 28 from the loading position to the receiving position. When the frame 28 comes to rest in the receiving position, the controller 50 signals the feeding device to feed a fastener 16 through the feed tube 20. Alternatively, the controller 50 may be configured to feed a fastener 16 when the proximity sensor 36 detects the new presence of a fastener driver 12 in the holster 34. The fastener 16 travels through the feed tube 20 into the end fitting 24, where it is gradually led to the receiver 30 adjacent to and aligned with the end fitting 24. The slope of the inner surface 26 of the end fitting 24 helps to vertically position the fastener 16 so that the fastener 16 smoothly passes into the receiver 30.

Next, when the proximity sensor 32 detects the presence of the fastener 16 in the receiver 30, the controller 50 signals the actuator 38 to index the frame 28 from the receiving position to the loading position. A user can then use one hand to insert a fastener driver 12 into the holster 34 when it is desired to load the fastener 16 onto the bit 14 of the fastener driver. Alternatively, the controller 50 may be configured to actuate indexing of the frame 28 from the receiving position to the loading position when the proximity sensor 32 detects the presence of a fastener and the proximity sensor 36 detects the presence of a fastener driver. In this configuration, the controller 50 would not index the frame 28 to the loading position until a user has inserted a fastener driver into the holster 34.

Once the fastener driver 12 is inserted into the holster 34 and the frame 28 is in the loading position, the user or the system controller 50 can momentarily operate the fastener driver 12 by actuating a trigger (or other similar on/off switch, including a digital signal) on the fastener driver. Operation of the fastener driver 12 causes the bit 14 to engage the fastener 16. In most cases, it should only be necessary to operate the fastener driver 12 between 1 and 3 seconds in order to engage the fastener 16.

The user may then remove the fastener driver 12 from the holster 34 to use the fastener driver to drive the engaged fastener 16 in a desired location. The proximity sensor 32 detects the absence of a fastener in the receiver 30 and the proximity sensor 36 detects the absence of a fastener driver 12 in the holster 34. The process then is repeated as the controller 50 signals the actuator 38 to index the frame 28 from the loading position to the receiving position.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The invention claimed is:

1. An automatic screw fastener loader comprising:
  a support member including an upstanding wall;
  a feed tube having a generally vertical end, the feed tube end being mounted to the support member;
  a movable frame pivotally mounted on the support member wall and operative to be indexed between a receiving position and a loading position, the frame including a receiver positioned vertically in the receiving position and aligned for receiving a fastener from the end of the feed tube;
  a holster mounted to the support member and operative to receive a fastener driver to load a screw fastener onto a bit of the fastener driver when the frame is in the loading position; and
  an actuator mounted to the support member wall and operatively connected to the pivotally mounted frame for actuating the frame to angularly index the receiver in the frame between the receiving position and the loading position, said positions lying in a common plane.

2. The automatic fastener loader of claim 1 including a proximity sensor mounted to the holster for detecting the presence of a fastener driver in the holster.

3. The automatic fastener loader of claim 1 including a proximity sensor mounted on the pivotable frame for detecting the presence of a fastener in the receiver.

4. The automatic fastener loader of claim 1 including a tube end fitting connected to the end of the feed tube, the end fitting mounting the tube to the support member.

5. The automatic fastener loader of claim 1 including a tube end fitting connected to the end of the feed tube, the end fitting mounting the tube to the support member.

6. The automatic fastener loader of claim 1 including a housing, wherein the support member wall forms a wall of the housing.

7. The automatic fastener loader of claim 6 wherein the housing includes at least one mounting member for mounting the housing to a separate support device.

8. The automatic fastener loader of claim 1 including a controller in communication with the actuator for operating the actuator to index the frame between the receiving position and the loading position.

9. The automatic fastener loader of claim 1 wherein the fastener receiver of the pivotally mounted frame is formed of a non-magnetic material to allow a magnetic bit of a fastener driver to withdraw a magnetically attracted screw fastener from the receiver without magnetic interference from the receiver.

* * * * *